United States Patent [19]

Furukawa et al.

[11] 3,946,089
[45] Mar. 23, 1976

[54] BLOCK COPOLYMER OF POLYAMIDE AND POLYETHER, AND ITS PREPARATION AND USE

[75] Inventors: Kaoru Furukawa; Chiaki Tsukamoto; Hiroshi Nagai; Koichi Matsunami; Hikoichi Nagano, all of Otsu, Japan

[73] Assignee: Toyo Boseki Kabushiki Kaisha, Osaka, Japan

[22] Filed: Feb. 6, 1974

[21] Appl. No.: 439,987

[30] Foreign Application Priority Data
Feb. 6, 1973  Japan .............................. 48-15318

[52] U.S. Cl. ...... 260/857 PG; 260/78 R; 264/210 F; 428/267; 428/395
[51] Int. Cl.² .......................................... C08L 77/00
[58] Field of Search .............................. 260/857 PG

[56] References Cited
UNITED STATES PATENTS

| | | | |
|---|---|---|---|
| 3,384,681 | 5/1968 | Kobayashi | 260/857 PG |
| 3,514,498 | 5/1970 | Okazaki | 260/857 PG |
| 3,522,329 | 7/1970 | Okazaki | 260/857 PG |
| 3,549,724 | 12/1970 | Okazaki | 260/857 PG |
| 3,632,666 | 1/1972 | Okazaki | 260/857 PG |

FOREIGN PATENTS OR APPLICATIONS

| | | | |
|---|---|---|---|
| 1,567,660 | 4/1969 | France | 260/857 PG |

*Primary Examiner*—Paul Lieberman
*Attorney, Agent, or Firm*—Stewart and Kolasch

[57] ABSTRACT

A block copolymer of 99.8 to 90 % by weight of a polyamide segment and 0.2 to 10 % by weight of a polyether segment dispersed in an island state of not more than about 10 $\mu$ in particle size, the polyamide segment comprising at least one diamine component containing 100 to 50 mol % (preferably 100 to 70 mol %) of m-xylylenediamine or its mixture with p-xylylenediamine and at least one dicarboxylic acid component containing 100 to 50 mol % (preferably 100 to 70 mol %) of at least one aliphatic dicarboxylic acid having 6 to 12 carbon atoms, the polyether segment comprising at least one polyether having a molecular weight of 2,000 to 20,000 and an amino group or a carboxyl group at at least one terminal position thereof and the block copolymer having a scattering index of not less than 1.

15 Claims, No Drawings

BLOCK COPOLYMER OF POLYAMIDE AND POLYETHER, AND ITS PREPARATION AND USE

The present invention relates to a block copolymer of polyamide and polyether, and its preparation and use. More particularly, it relates to a block copolymer of polyamide and polyether and its shaped products such as films, and their preparations.

In general, shaped products made of xylylene group-containing polyamides are excellent in a variety of physical and mechanical properties such as Young modulus, break strength, tear strength, gloss, transparency, chemical resistnace and gas barrier property. In addition, they can be melt molded to make various useful shaped articles such as films, sheets, vessels, bristles and filaments.

As commonly seen in condensation polymers, however, xylylene group-containing polymides unfavorably contain a certain amount (e.g. about 2 %) of cyclic oligomers. Different from oligomers as contained in aliphatic polyamides such as polycapramide and polyhexamethyleneadipamide which are readily soluble in water, those as contained in aromatic polyamides such as xylylene group-containing polyamides are hardly soluble in water. Because of this difference, the oligomers present in aliphatic polyamides can be easily eliminated by washing the chips or any shaped article made of such polymers with water, whereas those in aromatic polyamides are not. When, for instance, any shaped article made of xylylene group-containing polyamides is contacted with hot water or steam, a trace amount of the oligomers therein is migrated out on the surface but such stains can hardly be eliminated with water.

Besides, shaped articles made of xylylene group-containing polyamides such as films have high break strength and tear strength but are inferior in bending strength, puncture resistance and low temperature impact resistance.

As the result of extensive studies, it has been found that a block copolymer comprising a polyamide segment and a polyether segment wherein the polyether segment is dispersed in an island state, i.e. in an agglomerated form of not more than about 10 $\mu$ in particle size, the scattering index of the block copolymer being not less than 1, can overcome the said drawbacks as seen in conventional xylylene group-containing polyamides while retaining their advantageous properties.

According to the present invention, there is provided a block copolymer of 99.8 to 90% by weight of a polyamide segment and 0.2 to 10% by weight of a polyether segment dispersed in an island state of not more than about 10 $\mu$ in particle size, the polyamide segment comprising at least one diamine component containing 100 to 50 mol % (preferably 100 to 70 mol %) of m-xylylenediamine or its mixture with p-xylylenediamine and at least one dicarboxylic acid component containing 100 to 50 mol % (preferably 100 to 70 mol %) of at least one aliphatic dicarboxylic acid having 6 to 12 carbon atoms, the polyether segment comprising at least one polyether having a molecular weight of 2,000 to 20,000 and an amino group or a carboxyl group at at least one terminal position and the block copolymer having a scattering index of not less than 1.

The term "scattering index (N)" as herein used is intended to indicate the value calculated according to the following equation:

$$N = (E_{400} - E_{800})/D$$

wherein $E_{400}$ and $E_{800}$ are respectively the extinctions measured on an amorphous film prepared by melt extruding the said block copolymer at 400 m$\mu$ and 800 m$\mu$ and D is the thickness (mm) of the amorphous film.

Hitherto, there have been known a number of block copolymers of polyamides and polyethers, which are used for improvement of the antistatic property of nylon fibers and also for manufacture of elastic filaments [Japanese Patent Publications Nos. 15912/1960, 23349/1963, 10380/1973; U.S. Pat. 3,044,989, etc.]. Such advantageous properties are based on the utilization of the hydrophilic property and the low Young modulus of the polyether components therein. However, the technical effects attained by the present invention such as the prevention of the separation of the oligomers, the high folding endurance and the excellent low temperature impact strength have been neither realized nor suggested by the conventional techniques as above. It is particularly notable that the use of only a small amount of polyethers to be block polymerized is sufficient to achieve a remarkable effect.

The polyamide segment in the block copolymer of this invention may comprise a constituent consisting of m-xylylenediamine or its mixture with p-xylylenediamine and at least one aliphatic dicarboxylic acid having 6 to 12 carbon atoms in a content of 100 to 50 mol %, preferably of 100 to 70 mol %. In addition to such essential constituent, there may be included any optional constituent having an amine component other than the said diamine and/or a carboxylic acid component other than the said dicarboxylic acid in a content of 0 to 50 mol %, preferably of 0 to 30 mol %. Specific examples of the essential constituent are poly-m-xylyleneadipamide, poly-m-xylylenesuberamide, poly-m-xylylenesebacamide, poly-m-xylylenedecanamide, poly-m-xylylene/p-xylyleneadipamide, poly-m-xylylene/p-xylylenepimelamide, poly-m-xylylene/p-xylylenesuberamide, poly-m-xylylene/p-xylylenesebacamide, poly-m-xylylene/p-xylylenedecanamide, etc. As the amine component for the optional constituent, there may be exemplified aliphatic diamines (e.g. hexamethylenediamine, trimethylhexamethylenediamine, dodecamethylenediamine), alicyclic diamines (e.g. N-aminoethylpiperazine, N,N'-bisaminopropylpiperazine, 1,3-bisaminomethylcyclohexane, bis-p-aminocyclohexylmethane), aromatic diamines (e.g. p-bis(2-aminoethyl)benzene), etc. As the carboxylic acid component for the optional constituent, there may be exemplified aromatic dicarboxylic acids (e.g. terephthalic acid, isophthalic acid, 2,6-naphthalenedicarboxylic acid, 1,1,3-trimethyl-3-p-carboxyphenylindane-5-carboxylic acid). There may be also used as the amine or carboxylic acid component -aminocarboxylic acids (e.g. $\epsilon$-aminocaproic acid, 7-aminoheptanoic acid, 12-aminododecanoic acid, p-aminocyclohexylcarboxylic acid) and their lactams.

The content of p-xylylenediamine in the xylylenediamine component is favored to be from 0 to 30% by weight from the viewpoints of the coloring and the processability of the resulting block copolymer. Usually, the molecular weight of the block copolymer is desirably such that the relative viscosity is about 1.8 to 4.0.

In the block copolymer, the polyether segment is dispersed in an island state, i.e. in an agglomerated form of not more than about 10 $\mu$ in particle size. The polyether segment has a molecular weight of 2,000 to 20,000 and may be represented by the following formula:

$$X(OY)_nOX' \tag{A}$$

wherein X and X' are each hydrogen, a hydrocarbon group having 1 to 20 carbon atoms or a group having 1 to 6 carbon atoms and bearing amino, carboxyl and/or esterified carboxyl but at least one of them is esterified carboxyl, Y is alkylene or cycloalkylene having not more than 6 carbon atoms and $n$ is a number which can set the molecular weight of the compound (A) within a range of 2,000 to 20,000. Specific examples of the group having amino, carboxyl and/or esterified carboxyl represented by the symbol X or X' are amino-containing groups such as 2-aminoethyl, 3-aminopropyl, 2-hydroxy-3-aminopropyl or 2-hydroxy-N-butyl-3-aminopropyl, carboxyl-containing groups such as carboxymethyl, carboxyethyl, 2-carboxypropyl, 4-carboxybutyl, 5-carboxypentyl or carboxyphenyl, esterified carboxyl-containing groups such as methoxycarbonylmethyl, ethoxycarbonylmethyl, ethoxycarbonylethyl, 2-ethoxycarbonylpropyl, 4-methoxycarbonylbutyl or 5-butoxycarbonylpentyl, etc. As the group represented by the symbol Y, there may be exemplified $-CH_2-$,

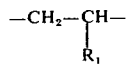

($R_1$: H or $CH_3$),

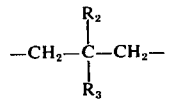

($R_2$: H or $CH_3$; $R_3$: H or $CH_3$), $-CH_2CH_2CH_2CH_2-$,

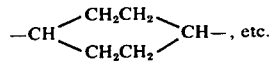

The polyether segment is required to have such a large molecular weight that it can be bound to the polyamide segment and dispersed in a island state in the latter. The molecular weight of the polyether segment capable of being dispersed in an island state is somewhat varied with the content of the polyether segment, and a molecular weight of not less than 2,000 is usually necessary in case of the content being from 0.2 to 10 % by weight. When the molecular weight is less than 2,000, the polyether segment is dissolved in the polyamide segment and can not attain the technical effect which is aimed at in the present invention. In addition, the physical and mechanical properties of the shaped products made of the resulting block copolymer such as gas barrier property and resistance to hot water are much decreased. For making easy the dispersibility of the polyether segment of not more than 10 μ in particle size into the polyamide segment, however, a too large molecular weight of the polyether segment is not favorable. Thus, the molecular weight of the polyether segment is required to be not more than 20,000.

In order to attain the purpose of this invention, the amount of the polyether segment in the block copolymer is desired not less than about 0.2% by weight. In case of the content exceeding about 10% by weight, however, the amount of the island structure formed by the polyether segment becomes too much so that the transparency of the block copolymer is much lowered with deterioration of various physical properties. The most preferred content is about 1 to 5% by weight.

One of the objects of this invention is to improve the disadvantageous properties inherent to polyamides such as the migration of oligomers leading to whitening, the inferior folding endurance, the poor puncture resistance and the small low temperature impact strength without deteriorating advantageous properties inherent thereto such as high Young modulus, breaking strength, burst strength and gas barrier property by the use of a relatively small amount of polyethers to be block polymerized. For attaining such objectives, it is desired to copolymerize a polyether component having at least one functional group such as amino or carboxyl at the terminal end position and a molecular weight of 2,000 to 20,000 in a proportion of 0.2 to 10% by weight on the block copolymer. The effect is, however, much associated with the conditions under which the block copolymer is manufactured, even if the composition is the same.

When a polyether component having an appropriate functional group is copolymerized on a polyamide component by heating, the incorporation of the polyether component may be effected at any of the initial, intermediary and late stages of polymerization, but it is preferred that such incorporation is carried out at the initial to intermediary stage of pressurized polymerization in view of the solubility of the polyether component into the polyamide component or water and the reactivity among them. The most preferred condition is to effect the waterpressurized polymerization under a gauge pressure of 5 to 15 kg/cm² with suitable stirring up to the production of a polymer having a low degree of polymerization, for instance, corresponding to a relative viscosity of about 1.2 to 1.5 and, after releasing the pressure to atmospheric pressure, continuing the polymerization so as to make a higher degree of polymerization. When the evaporation of water is effected under a lower pressure (e.g. 4 kg/cm² gauge pressure) and then the temperature is elevated above the melting point of the polymer while maintaining the said pressure, the polyether component in the obtained polymer is dispersed in an island state of more than 10 μ even if incorporated at the initial stage. Thus, the physical properties of the produced block copolymer are not favorable. The favorable gauge pressure range may be 7 to 13 kg/cm². In case of the pressure being above 15 kg/cm², the polyether component is not agglomeratively dispersed into the polyamide component and makes a uniform phase so that the folding endurance, the low temperature impact strength, the gas barrier property and the like are considerably lowered.

In addition to the polymerization conditions, the agitation force, the concentration of the nylon salt aqueous solution, the rate of water evaporation and the like may be appropriately selected for obtaining favorable properties of the block copolymer.

The characteristic properties of the block copolymer prepared as above can be evaluated by melting a piece of the block copolymer on a hot plate under nitrogen atmosphere; pressing the melt to a constant thickness, followed by immediate cooling to make an amorphous film; and measuring the light absorption spectrum of the film and observing the film by a microscope.

Namely, such amorphous film shows a smooth scattering extinction which decreases hyperboloidally and monotonously from the ultraviolet region to the visible region, and the absorption to particularly strong in the region of short wave length. The block copolymer having a scattering index within the following range exhibits generally favorable physical properties: $N = (E_{400} - E_{800})/d \geq 1$. Particularly preferred is the one which shows $N \geq 2$.

On the microscopic observation of the island state in the amorphous, undrawn film as above, the preferred one shows the maximum particle size of not more than 10 $\mu$. The more preferred is the one having a maximum particle size of not more than 6 $\mu$ and an average particle size of not more than 3 $\mu$. When the particle size is more than 10 $\mu$, the improvement of the puncture resistance and the folding endurance in the shaped products made of the block copolymer is not seen, and the physical and mechanical properties are rather lowered. The once produced dispersion state is not changed even when melted again.

When any additive (e.g. weathering agent, anti-oxidizing agent, anti-coloring agent, heat stabilizer, whitening agent, lubricant, nucleating agent, pigment, filler) in the block copolymer affords an influence on the absorbance in the above evaluation, deduction or compensation is a matter of course needed.

Into the block copolymer, the incorporation of a phenolic oxidation inhibitor, an organic or inorganic oxyphosphorus compound or its alkali metal salt or ester, or the like is practically favored.

Melt extrusion of the block copolymer as above can afford a transparent, undrawn film. The undrawn film may be used as such as a deep drawing material. Alternatively, it may be drawn to give an oriented or shrunk film having excellent properties. Further, it may be co-extruded with any other polymer to make a laminated film. In the form of such film, the characteristic properties of the block copolymer of the invention are particularly exhibited. The provision of such film is also one of the objects of this invention.

By the present invention, the block copolymer is melt extruded to give a film of 10 to 1,000 $\mu$ in thickness, of which the scattering inex is not less than 1 and in which the polyether segment is dispersed in an island state of not more than 10 $\mu$ in maximum particle size. Such film is excellent in folding endurance, puncture resistance, low temperature impact strength and gas barrier property.

For the preparation of the film, the block copolymer may be dried to a water content of 0.01 to 0.1 % by weight, heated at a temperature higher than the melting point (preferably from about 250° to 280°C), extruded through a T die in a film form and cooled on a roll or in an atmosphere, for instance, of 30° to 70°C to a temperature below the secondary transition point, whereby a transparent, undrawn film is obtained. When the cooling is effected at a temperature higher than the secondary transition point of the block copolymer, a flat film is hardly obtained and creases are apt to be produced so as to make difficult the uniform drawing in the subsequent drawing step.

When desired, the above prepared undrawn film may be uniaxially or biaxially drawn to produce favorable properties as not seen in the undrawn film. In the case of the biaxial drawing, it may be carried out simultaneously or stepwise. The temperature for drawing (T°C) may be appropriately controlled depending on the water content (W %) and the drawing rate ($\delta$ %/min) of the undrawn film. The preferred condition is representable by the following formula:

$$T_g + 50 + 7 \log (\delta/1000) - 12W \geq T \geq T_g - 6W$$

wherein $T_g$ is the secondary transition point. The water content of the undrawn film is varied with the environment under which the drawing is carried out and can be appropriately regulated. From the practical viewpoint, the water content is controlled normally below 5 % by weight, preferably below 3 % by weight. The drawing rate may be varied within a broad range depending on the thickness of the film, the physical properties, the drawing apparatus and the economics of the situation. Practically, it may be from 500 to 50,000 %/min, preferably 1,000 to 10,000 %/min. Accordingly, the preferred drawing temperature for obtaining a uniformly drawn film may be from about 60° to 110°C. When the drawing temperature is too low, a high tension is required for drawing, whereby the film is broken at the initial stage of drawing in most cases. When it is too high, the drawing at a high draw ratio produces necking and uneven thickness as well as the breakage at the rate stage of drawing. The draw ratio may be 2 to 6, preferably 2.5 to 4.5 in one direction. In case of biaxial drawing, the draw ratio in the machine direction may be the same as or different from that in the transverse direction. The same draw ratio in the mechanical and transverse directions results in the same drawing rate in both directions. When the draw ratio in the mechanical direction is different from that in the transverse direction, the drawing rates in both directions may be different from each other in accordance therewith.

The thus produced drawn film can show good physical and mechanical properties as such. Except where the shrinking property is positively utilized as in the case of shrunk films, however, it is usually subjected to heat treatment so as to impart a size stability thereto. The heat treatment may be carried out at a temperature not less than 5°C above the higher temperature of the said drawing temperatures and lower than the melting point of the block copolymer, usually from 120° to 210°C, for a period of not more than 5 minutes, preferably from 15 to 60 seconds. When the temperature for heat treatment is too high, the film tends to be broken, the orientation produced by drawing becomes uneven, the film thickness is made disuniform and the physical properties are deteriorated. Even in the said preferred range of temperature, heat treatment for a too long period of time cuases disadvantageously various unfavorable phenomena such as oxidation, heat deterioration and cleavage of the molecular chain. During the heat treatment, the film is maintained under a tensioned or relaxed state. As the result of the heat treatment or heat fixation treatment as above, the crystallinity of the film is increased, the strain produced in the course of drawing is eliminated and the mechanical property, particularly the size property, of the film are improved.

The thus obtained film has an excellent crystallinity and an orientation balanced both in the machine and transverse directions. Such film also has various excellent properties as seen in the undrawn film such as a high low temperature impact strength (e.g. more than 6 kg.cm/25 $\mu$ at $-40°C$), a good oxygen permeability coefficient (e.g. $2 \times 10^{-12}$ ml.cm/cm$^2$.sec.cmHg) and the like. It also has many good properties as a biaxially drawn film such as breaking strength (MD, TD) of more than 10 kg/mm², breaking elongation of 20 to 120 %, burst strength of more than 30 kg/mm², initial Young modulus of more than 300 kg/mm², end tearing strength of more than 15 kg/25 μ, folding endurance of more than 150,000 times, puncture resistance of more than 200 times, transparence (haze) of less than 10 and transparence after treatment with boiling water (haze) of less than 15.

Illustrating the relationship between the above properties and the polyether component used in this invention, any film satisfactory in folding endurance, low temperature impact strength and transparence after treatment with boiling water can not be obtained when the polyether component as specified above is not used or not present in the dispersion state as specified above. In order to obtain a film satisfactory in the above respects, the amount of the polyether component must be not less than 0.2% by weight. The increase of the amount fo the polyether component can improve remarkably the folding endurance, the low temperature impact strength and the transparence after treatment with boiling water without lowering the breaking strength, the breaking elongation, the burst strength and the oxygen permeability coefficient inherent to a film of the polyamide component. When, however, the amount of the polyether component exceeds 10 % by weight, the exertion of a more excellent effect can not be expected and the mechanical properties are rather lowered.

Hereupon, in case of the moelcular weight of the polyether component being less than 2,000, the incorporation in a large amount results in the increase of the folding endurance but the low temperature impact strength and the transparence after treatment with boiling water become unsatisfactory. In case of the molecular weight being more than 20,000, the transparence is much decreased.

Particularly favorable film properties are seen in a film having a scattering index (N) of not less than 2 and an island structure of not more than 10 μ in maximum particle size. Such film is particularly excellent in puncture resistance, low temperature impact strength and gas barrier property. Since the biaxially drawn film is provided with various advantageous properties required in processing and circulation markets such as breaking strength, hot water resistance, burst strength, size stability, suitability for printing, laminate adhesion and the like, it is quite suitable as a packaging material for transportation and storage of various foods and pieces. It is also suitable for the use as an electrical material or a magnetic recording material.

The film of this invention may be used in the form of a simple film or of a coated or laminated film. Examples of the latter are as follows:

Film/Heat seal layer;
Film/Metallic foil/Heat seal layer;
Film/Printing layer/Heat seal layer;
Film/Film suitable for printing/Printing layer/Heat seal layer;
Film/Printing layer/Metallic foil/Heat seal layer;
Printing layer/Film/Heat seal layer;
Surface protecting layer/Printing layer/Film/Heat seal layer; etc.

wherein the heat seal layer is an easily heat sealable coating or laminating layer having a lower melting point than that of the film of the invention and may be constituted, for instance, with low density polyethylene, high density polyethylene, nonoriented polypropylene, polyvinyl chloride, polyvinylidene chloride, chlorinated polypropylene or surlin A.

Practical and presently preferred embodiments of the present invention are illustratively shown in the following Examples wherein parts and % are by weight. The physical constants are determined as follows:

1. Relative viscosity ($\eta r$):

The relative viscosity is measured on a solution of the polymer (1 g) in m-cresol (100 ml) at 25°C by the use of an Ostwald viscosimeter.

2. Scattering index:

A piece of the polymer is melted on a hot plate in nitrogen atmosphere, pressed to make a uniform thickness of less than 100 μ and cooled rapidly to give an amorphous film. The extinction of the film at 360 to 900 mμ by a spectrometer ("Hitachi Model 124" manufactured by Hitachi, Ltd.) is measured, and the values at 400 mμ ($E_{400}$) and at 800 mμ ($E_{800}$) are read off. On the other hand, the exact and precise thickness (D, mm) of the film is measured by a microgauge. According to the following equation, the scattering index (N) is calculated:

$$N = \frac{(E_{400} - E_{800})}{D}$$

When the film contains any additive which affords an influence on the extinction in the said range of wave length, deduction is made separately.

3. Breaking strength, breaking elongation and Young modulus:

As described in ASTM (American Society of Testing for Materials) D-882, measurement is made by elongating a specimen of 50 mm long and 10 mm wide in the mechanical and tranverse directions at a rate of pulling of 100 mm/min under the conditions of a temperature of 20°C and a relative humidity of 65 % by the use of a load elongation tester ("Tensilon UTM-3" manufactured by Toyo Sokki K.K.). From the initial gradient of the stress-strain curve, Young modulus is calculated.

4. Burst strength:

A specimen of 80 mm in diameter is fixed on a load cell of 45 mm in inner diameter and pushed by a rod type load having a semi-spherical top of 38 mm in diameter at a rate of 50 mm/min. The burst load is measured under the conditions of a temperature of 20°C and a relative humidity of 65 % by the use of a load elongation tester Tensilon UTM-3.

5. Low temperature impact strength:

Measurement is made at a temperature of -40°C by the use of a film impact tester.

6. End tear strength:

As described in JIS (Japanese Industrial Standard) C2318, a specimen of 20 mm wide is placed on the end of a M type metal plate having an opening angle of 150°, and the tensile burst strength is measured at 20°C by the aid of a load elongation tester Tensilon UTM-3 with a rate of 200 mm/min.

7. Folding endurance:

As described in JIS P8115, a film of 15 mm wide is pinched by a chuck in a folding endurance tester and, under the conditions of a temperature of 20°C and a relative humidity of 65 %, folded repeatedly with an angle of ±135° repeatedly at a rate of 175 times/min by charging a load of 1 kg. The number of folding times up to breaking are counted.

8. Puncture resistance:

A square film of 15 cm long and 15 cm wide having a certain thickness is bound at an end of a Y shaped glass pipe and expanded to make a swollen bag. Two other ends of the pipe are connected respectively to a vacuum line and a pressure air line of 0.2 kg/cm² gauge pressure by intervening switch valves. The switch valves are alternately and intermittently operated in automation so as to subject the atmosphere in the bag under the reduced and elevated pressure conditions whereby a flectional stress is repeatedly given. The times of repetition up to the production of pinholes in the bag due to the flectional stress which causes a depression in the extent of the vacuum are counted under the conditions of a temperature of 23°C and a relative humidity of 65 %.

9. Oxygen permeability coefficient:

As described in ASTM D-1434, measurement is made on the basis of the change in pressure at 30°C using a gas permeability measuring apparatus.

10. Haze and transparence:

As described in JIS K6714, these are calculated according to the following equations based on the values measured at 20°C by a haze tester:

Transparence: $Ti = \frac{T_2}{T_1} \times 100$ $Td = \frac{T_4 - T_3(T_2/T_1)}{T_1} \times 100$ Haze: $H = \frac{Td}{Ti} \times 100 \ (\%)$ wherein $T_1$ is the amount of incident light, $T_2$ is the total amount of transmitted light, $T_3$ is the amount of scattered light due to the apparatus and $T_4$ is the amount of scattered light due to the apparatus and the specimen.

11. Plane orientation index and degree of balance:

The refractive indexes of a specimen in the machine direction ($x$), the transverse direction ($y$) and the vertical direction ($z$) are measured by the use of an Abbe's refractometer, and calculations are made according to the following equations:

Plane orientation index $= \frac{x+y}{2} - z$

Degree of balance $= x - y$

12. Peel strength:

Using a laminated film of 1 cm wide and 10 cm long having a non-adhered zone of 5 cm in one side as a specimen, the stress required for peeling off the polyamide film layer from the polyolefin layer at a peel angle of 180° with a rate of 200 mm/min is measured by a load elongation tester Tensilon UTM-3.

13. Heat seal strength:

Two films are heat bonded at 180°C under pressure of 2 kg/cm² for 1 second, and the stress required for peeling off the bonded films from each other at a rate of 200 mm/min is measured by a load elongation tester Tensilon UTM-3.

EXAMPLE 1

Polyethylene glycol having a number average molecular weight of 20,000, 8,300 4,080, 2,000, 1,000 or 600 is subjected to cyanoethylation in toluene in the presence of sodium methoxide as a catalyst and then to hydrogenation using Raney nickel as a catalyst to give bis-aminopropyl(polyethylene oxide) (hereinafter referred to as "PEG-DA") to an amination degree of 82 to 97 %. To demineralized water (2,000 parts), the nylon salt of xylylenediamine consisting of 27 % of p-xylylenediamine (hereinafter referred to as "PXD") and 73 % of m-xylylenediamine (hereinafter referred to as "MXD") with adipic acid (1,000 parts) and the above prepared PEG-DA (30 parts) are added, and an equivalent amount of adipic acid with respect to the said PEG-DA is added thereto. In a 4 liter volume autoclave, the resultant mixture is subjected to polymerization at 280°C under an autogenic pressure, and the produced polymer is extruded to make chips. The melting point of the polymer is 262°C. The relative viscosity is as follows: 2.51, 2.48, 2.53, 2.56, 2.45, 2.47.

After drying, the chips of the polymer are extruded at 280°C to make a film of about 200 μ in thickness, and the film is drawn at 102°C at a draw ratio of 3.2 in the machine direction and at a draw ratio of 3.5 in the transverse direction and set at 180°C to make a transparent film.

On the microscopic observation, a matrix of island structure of 1 to 10 μ in particle size is recognized in the film made of the polymer containing PEG-DA of 2,000 or more in molecular weight.

Twenty pieces of the said transparent film and of a transparent film made of a polymer but containing no PEG-DA in the same manner as above (for control), each piece having a size of 10 cm long and 10 cm wide, are extracted with boiling water and then dried. From the change in the weight of the film before and after the extraction, the extracted amount is determined. Further, the polymer before formation into a transparent film is subjected to measurement of the extinction, and the scattering index is determined. The results are shown in Table 1.

Table 1

| No. | Molecular weight of polyethylene glycol | Decreased weight on extraction (%) | | | | | Haze (%) | | | Scattering index N |
|---|---|---|---|---|---|---|---|---|---|---|
| | | 10 min. | 30 min. | 1 hr. | 2 hrs. | 5 hrs. | 0 min. | 30 min. | 5 hrs. | |
| 1 | 20,000 | 0.88 | 0.92 | 0.96 | 1.01 | 1.06 | 5.3 | 7.8 | 7.3 | 2.1 |
| 2 | 8,300 | 0.82 | 0.87 | 0.91 | 0.97 | 1.04 | 4.7 | 5.9 | 5.2 | 8.8 |
| 3 | 4,080 | 0.90 | 0.96 | 1.02 | 1.04 | 1.09 | 3.2 | 4.5 | 3.7 | 7.9 |
| 4 | 2,000 | 1.07 | 1.14 | 1.21 | 1.26 | 1.33 | 2.1 | 6.9 | 5.8 | 1.2 |
| 5 | 1,000 | 1.32 | 1.42 | 1.52 | 1.59 | 1.66 | 2.0 | 11.5 | 8.8 | 0.3 |
| 6 | 600 | 1.46 | 1.58 | 1.67 | 1.75 | 1.89 | 1.8 | 13.6 | 9.2 | 0.1 |
| 7 | Control | 1.62 | 1.87 | 1.99 | 2.10 | 2.15 | 2.8 | 14.1 | 9.8 | 0.1 |

From the above results, it is understood that, in case of PEG-DA of 2,000 or more in molecular weight being copolymerized and the resulting polymer having a scattering index of not less than 1, the extracted amount is apparently decreased. Although the dissolving can be not completely blocked, the whitening may be considered not to occur, because only the oligomers having a large solubility are extracted.

EXAMPLE 2

Polyethylene glycol having a number average molecular weight of 4,080 is subjected to cyanoethylation in dioxane in the presence of sodium hydroxide as a catalyst, followed by neutralization with an acid and evaporation of the solvent. The residue is dissolved in methanol, and hydrogenation is carried out in the presence of Raney nickel as a catalyst to give PEG-DA in an amination degree of 90 %. To demineralized water (2,000 parts), the nylon salt of MDX with adipic acid (1,000 parts) and the above prepared PEG-DA (25 parts) are added, and an equivalent amount (i.e. 0.09 part) of adipic acid with respect to the said PEG-DA is added thereto. The resulting mixture is charged in a 4 liter volume autoclave, the atmosphere is replaced by nitrogen and the temperature is elevated with the agitation rate and the water evaporating pressure as shown in Table 2. Then, the pressure is brought to atmospheric pressure while elevating the temperature, and the polymerization under atmospheric pressure is continued at 260°C for 2 hours. The produced polymer is extruded to make chips. The polymer shows a melting point of 239°C and a relative viscosity of 2.30 (when determined in 1 % m-cresol solution at 25°C). The scattering index of the polymer as well as the maximum particle size of the islands dispersed in the polymer (by the microscopic observation) are examined. The results are shown in Table 2.

Table 2

| No. | Water evaporating pressure (kg/cm² gauge) | Agitation rate (r/m) | Scattering index N | Maximum particle size of island (μ) |
|---|---|---|---|---|
| 1 | 4 | 0 | 0.7 | 14 |
| 2 | 4 | 50 | 0.9 | 11 |
| 3 | 4 | 100 | 1.5 | 9 |
| 4 | 8 | 0 | 0.9 | 6 |
| 5 | 8 | 50 | 6.8 | 3 |
| 6 | 8 | 100 | 7.7 | < 1 |
| 7 | 15 | 0 | 2.1 | < 1 |
| 8 | 15 | 50 | 0.6 | < 1 |
| 9 | 15 | 100 | 0.4 | < 1 |

EXAMPLE 3

Polyethylene glycol having a number average molecular weight of 3,400 is treated with metallic sodium in dioxane to convert it into the sodium alcoholate form and is then treated with ethyl monochloroacetate to give polyethylene glycol-bis-acetyl ethylate. This product (25 parts) is admixed with the nylon salt of MXD with adipic acid (1,000 parts) in water, and the polymerization is carried out as in Example 2, No. 5. The thus produced polymer shows a melting point of 239°C, a relative viscosity of 2.23 and a scattering index of 3.8. On the microscopic observation, the island structure of not more than 2 μ in particle size is recognized.

EXAMPLE 4

The dried chips of the polymer obtained in EXample 2, No. 5 or Example 3 are extruded at 260°C by the use of a T die to make a film of about 200 μ in thickness, which is then drawn at 95°C at a draw ratio of 3.5 in both of the machine and transverse directions and heat set to give a transparent film.

In the same manner as above, there are prepared transparent films made of a polymer manufactured by the same amount of polyethylene glycol but not aminated at the end and made of a polymer not including any polyethylene glycol.

The transparent films prepared as above are treated with steam for 20 minutes, and the transparence and the haze are measured. The results are shown in Table 3 wherein the value after water washing indicates the one measured on the film after treatment with steam and washing sufficiently with water at 30°C in a washing machine.

Table 3

| No. | Film materials | Transparence (%) | | | Haze (%) | | |
|---|---|---|---|---|---|---|---|
| | | Before treatment | After treatment | After water washing | Before treatment | After treatment | After water washing |
| 1 | PEG-DA containing MXD-6 | 88.8 | 88.4 | 88.6 | 3.0 | 5.2 | 3.6 |
| 2 | PEG-DC containing MXD-6 | 88.5 | 88.1 | 88.4 | 3.0 | 4.8 | 3.7 |
| 3 | PEG containing MXD-6 | 87.6 | 86.8 | 87.2 | 4.5 | 7.8 | 7.5 |
| 4 | MXD-6 | 89.2 | 78.8 | 86.7 | 2.8 | 34.6 | 7.6 |

EXAMPLE 5

A 40 % aqueous solution containing the nylon salt of xylylenediamine consisting of 1 % of PXD and 99 % of MXD with adipic acid (1,200 parts) and a 10 % aqueous solution of the salt of PEG-DA (PEG number average molecular weight, 8,300; amination degree, 90 %) (12 parts) with an equivalent amount of adipic acid with respect thereto are charged in an autoclave, the atmosphere is replaced by nitrogen and the temperature is elevated under a pressure of 10 kg/cm² to evaporate water. Then, the polymerization under atmospheric pressure is carried out at 260°C, and the produced polymer is extruded to make chips, which are dried at 100°C under reduced pressure. M.P., 239°C. ηr, 2.37. Water content, 0.05 %. The dried chips are melted at 260°C in an extruder and extruded through a T die on a chill roll to make a film of 240 μ in thickness. The film is drawn at 100°C first in the machine direction at a draw ratio of 3.8 and then in the transverse direction at a draw ratio of 4.0, the drawing rate being 5,000 %/min, followed by heat setting at 200°C for 30 seconds to make a transparent, elastic film.

EXAMPLE 6

As in Example 5, the salt containing 1 % of PEG-DA (PEG number average molecular weight, 610, 1,006, 2,030, 4,000 or 20,000; amino value percent, 80 to 90 %) is subjected to polymerization, the produced polymer is extruded to form a film and the film is drawn and heat set to give a transparent film. The physical properties of the transparent film obtained in this Example as well as those of the transparent film obtained in Example 5 are shown in Table 4.

The treatment with boiling water is done on the following sheets during 30 minutes. Each examining piece having a size of 10 cm long and 10 cm wide is held between two polyethylene terephthalate films of the same size as the piece, and several points of the piece ends and the polyethylene terephthalate film ends are pinched to each other to make a sheet.

From the above results, it is seen that, in case of the molecular weight of polyethylene glycol being not more than 2,000, the folding endurance is strengthened more than 3 times, the burst strength, the low temperature impact strength and the end tearing strength are much improved, and the haze after treatment with boiling water is remarkably increased.

EXAMPLE 7

As in Example 5, a 35 % aqueous solution containing the nylon salt of MXD with adipic acid, which also contains 2.5, 5.0 or 10 % of PEG-DA (PEG number average molecular weight, 4,000), is charged in an autoclave, a phenolic oxidation inhibitor ("Irganox 1010" manufactured by Ciba-Geigy A.G.) is added thereto to make a concentration of 0.05 %, and polymerization is carried out at 260°C to give a polymer. The polymer is extruded at 255°C through a T die to make a film of about 230 $\mu$ in thickness, and the film is drawn at 98°C first in the machine direction at a draw ratio of 3.8 and then in the transverse direction at a draw ratio of 4.0 with a rate of 5,000 %/min, followed by heat setting at 200°C for 30 seconds. The physical properties of the film thus obtained are shown in Table 5.

Table 4

| Run No. | 2 | | 3 | | 4 | | 5 | | 6 | | 1 | | 7 | |
|---|---|---|---|---|---|---|---|---|---|---|---|---|---|---|
| Molecular weight of polyethylene glycol | | | 610 | | 1006 | | 2030 | | 4000 | | 8300 | | 20000 | |
| Relative viscosity ($\eta r$) | 2.31 | | 2.33 | | 2.34 | | 2.52 | | 2.50 | | 2.37 | | 2.42 | |
| Thickness ($\mu$) | 18 | | 17 | | 18 | | 18 | | 19 | | 17 | | 18 | |
| | MD | TD | MD | TD | MD | TD | MD | TD | MD | TD | MD | TD | MD | TD |
| Breaking strength (kg/mm²) | 13.5 | 22.2 | 18.8 | 25.2 | 16.0 | 24.4 | 17.4 | 25.1 | 15.5 | 19.5 | 19.3 | 21.0 | 18.6 | 22.3 |
| Breaking elongation (%) | 115 | 75 | 82 | 57 | 97 | 74 | 101 | 62 | 22 | 38 | 37 | 22 | 36 | 23 |
| Initial Young modulus (kg/mm²) | 550 | 560 | 402 | 450 | 370 | 386 | 380 | 430 | 446 | 386 | 360 | 512 | 394 | 465 |
| Burst strength (kg/25 $\mu$) | 38 | | 40 | | 40 | | 45 | | 49 | | 50 | | 49 | |
| Folding endurance (time) | 80163 | | 96914 | | 178570 | | 235271 | | 320468 | | 1856354 | | 2000136 < | |
| End tearing strength (kg/25 $\mu$) | 18 | | 17 | | 20 | | 22 | | 25 | | 25 | | 24 | |
| Low temperature impact strength (kg-cm/25 $\mu$) | 5.2 | | 4.5 | | 6.1 | | 7.0 | | 7.6 | | 8.7 | | 8.8 | |
| Scattering index ($\frac{E_{400}-E_{800}}{D}$) | 0.0 | | 0.0 | | 0.1 | | 0.4 | | 2.5 | | 4.1 | | 7.7 | |
| Puncture resistance (time) | 35 | | 52 | | 81 | | 149 | | 214 | | 858 | | 431 | |
| Transparence (%) | 88.8 | | 89.0 | | 88.8 | | 90.2 | | 89.0 | | 88.0 | | 87.5 | |
| Haze (%) | 2.8 | | 1.8 | | 1.6 | | 1.7 | | 2.1 | | 2.9 | | 4.8 | |
| Haze after treatment with boiling water (%) | 41 | | 36.0 | | 25.3 | | 14.8 | | 3.6 | | 6.3 | | 8.9 | |
| Oxygen permeability coefficient (CC-cm/cm².sec.cmHg) | 2.8×10⁻¹³ | | 3.9×10⁻¹³ | | 4.5×10⁻¹³ | | 4.8×10⁻¹³ | | 2.0×10⁻¹³ | | 2.0×10⁻¹³ | | 2.7×10⁻¹³ | |
| Plane orientation index | 0.033 | | 0.043 | | 0.039 | | 0.039 | | 0.035 | | 0.032 | | 0.033 | |
| Degree of balance | −0.008 | | −0.003 | | −0.030 | | −0.032 | | −0.018 | | −0.019 | | −0.024 | |
| Particle size of islands ($\mu$) | — | | — | | <1 | | <2 | | <4 | | <6 | | <10 | |

Table 5

| Run No. | 8 | | 9 | | 10 | |
|---|---|---|---|---|---|---|
| Content of polyethylene glycol (%) | 2.5 | | 5 | | 10 | |
| Relative viscosity ($\eta r$) | 2.24 | | 2.27 | | 2.31 | |
| Thickness ($\mu$) | 18 | | 17 | | 18 | |
| Scattering index ($\frac{E_{400}-E_{800}}{D}$) | 11.3 | | 17.8 | | 25.1 | |
| Puncture resistance (time) | 762 | | 801 | | 2310 | |
| | MD | TD | MD | TD | MD | TD |
| Breaking strength (kg/mm²) | 17.8 | 18.5 | 16.6 | 19.8 | 15.3 | 18.4 |
| Breaking elongation (%) | 44 | 30 | 46 | 35 | 64 | 37 |
| Initial Young modulus (kg/mm²) | 423 | 458 | 405 | 422 | 337 | 358 |
| Burst strength (kg/25 $\mu$) | 49 | | 46 | | 42 | |
| End tearing strength (kg/25 $\mu$) | 25 | | 23 | | 20 | |
| Folding endurance (time) | 1457002 | | 2008572 < | | 2019005 < | |
| Low temperature impact strength (kg-cm/25 $\mu$) | 8.5 | | 8.3 | | 7.5 | |
| Transparence (%) | 88.5 | | 86.8 | | 85.1 | |
| Haze (%) | 3.7 | | 6.8 | | 8.5 | |
| Haze after treatment with boiling water (%) | 4.6 | | 8.3 | | 10.2 | |
| Oxygen permeability coefficient (CC-cm/cm².sec.cmHg) | 1.6×10⁻¹³ | | 3.8×10⁻¹³ | | 5.6×10⁻¹³ | |
| Plane orientation index | 0.038 | | 0.036 | | 0.033 | |
| Degree of balance | −0.023 | | −0.027 | | −0.013 | |

| Table 5-continued | | | | |
|---|---|---|---|---|
| Particle size of islands ($\mu$) | 4 | 5 | 8 | |

EXAMPLE 8

Polyxylyleneadipamide containing 2.5 % of PEG-DA (PEG number average molecular weight, 8,300) in the condensate of MXD/PXD (73/23 in molar ratio) with adipic acid (No. 12), polyxylyleneadipamide containing 2.5 % of PEG-DA (PEG number average molecular weight, 4,000) in the said condensate (No. 13), polyxylyleneadipamide containing 2.5 % of PEG-DA (PEG number average molecular weight, 2,980; amination degree, 91 %) in the said condensate (No. 14), polyxylyleneadipamide containing 2.5 % of polyethylene glycol/polypropylene glycol block copolymer (weight ratio, 50 : 50; PEG number average molecular weight, 3,500; amination degree, 100 %) in the said condensate (No. 15) and polyxylyleneadipamide not containing any polyether (No. 11) are each extruded as in Example 1 to make a fiim of about 250 $\mu$ in thickness, which is then drawn and heat set. The physical properties of the film are shown in Table 6.

The method of the treatment with boiling water is the same as in Example 6.

with a circumferential speed of 2 m/min at the low speed roll. The resulting uniaxially drawn film is then sent to a tenter heated at 110°C and drawn in the transverse direction at a draw ratio of 4.5 with a rate of deformation of 5,000 %/min. The resultant biaxially drawn film is passed through a zone for heat treatment at 200°C for 20 seconds with a relaxation of 3 %. The physical properties of the thus obtained heat set film are shown in Table 7.

The method of the treatment with boiling water is the same as in Example 6.

Table 7

| | MD | TD |
|---|---|---|
| Thickness ($\mu$) | | 12 |
| Breaking strength (kg/mm$^2$) | 19.8 | 26.9 |
| Breaking elongation (%) | 43 | 32 |
| Initial Young modulus (kg/mm$^2$) | 410 | 454 |
| Burst strength (kg/25 $\mu$) | 46 | |
| End tearing strength (kg/25 $\mu$) | 26 | |
| Folding endurance (time) | 1.56 × 10$^6$ | |
| Puncture resistance (time) | 620 | |
| Low temperature impact strength (kg-cm/25 $\mu$) (−40°C) | 7.8 | |
| Transparance (%) | 88.0 | |
| Haze (%) | 3.5 | |

Table 6

| Run No. | 11 | 12 | 13 | 14 | 15 |
|---|---|---|---|---|---|
| Polyether | Not added | PEG (A) | PEG (A) | PEG (A) | PEG/PPG (A) |
| Molecular weight | — | 8300 | 4000 | 2980 | 3500 |
| Relative viscosity ($\eta r$) | 2.46 | 2.44 | 2.45 | 2.43 | 2.43 |
| Thickness ($\mu$) | 20 | 20 | 20 | 21 | 21 |
| Scattering index $\frac{(E_{400}-E_{800})}{D}$ | 0.1 | 7.8 | 10.6 | 4.2 | 1.4 |
| | MD  TD | MD  TD | MD  TD | MD  TD | MD  TD |
| Breaking strength (kg/mm$^2$) | 25.1  26.5 | 24.3  27.0 | 24.1  26.3 | 22.7  25.4 | 22.9  24.3 |
| Breaking elongation (%) | 58  51 | 62  50 | 67  53 | 77  62 | 74  59 |
| Initial Young modulus (kg/mm$^2$) | 547  564 | 522  540 | 493  538 | 452  512 | 463  508 |
| Burst strength (kg/25 $\mu$) | 44 | 52 | 43 | 50 | 47 |
| End tearing strength (kg/25 $\mu$) | 21 | 26 | 26 | 25 | 24 |
| Folding endurance (time) | 74854 | 2000718 < | 1380166 | 1504982 | 1612751 |
| Low temperature impact strength (kg-cm/25 $\mu$) | 5.1 | 8.5 | 8.3 | 8.0 | 7.0 |
| Puncture resistance (time) | 38 | 1020 | 747 | 350 | 100 |
| Transparence (%) | 89.5 | 86.7 | 88.5 | 88.7 | 88.3 |
| Haze (%) | 2.0 | 4.6 | 2.9 | 2.8 | 2.4 |
| Haze after treatment with boiling water (%) | 27.9 | 7.9 | 4.9 | 4.4 | 4.5 |
| Oxygen permeability coefficient (CC-cm/cm$^2$.sec.cmHg) | 2.5×10$^{-13}$ | 1.6×10$^{-13}$ | 1.6×10$^{-13}$ | 1.7×10$^{-13}$ | 2.6×10$^{-13}$ |
| Plane orientation index | 0.033 | 0.032 | 0.035 | 0.036 | 0.033 |
| Degree of balance | −0.018 | −0.008 | −0.012 | −0.023 | −0.014 |
| Particle size of islands ($\mu$) | — | ≦6 | ≦4 | ≦2 | ≦3 |

EXAMPLE 9

As in Example 5, a 40 % aqueous solution containing the nylon salt of MXD with adipic acid, which also contains 3 % of PEG-DA (PEG number average molecular weight, 4,000), is charged in an autoclave, and polymerization is carried out at 260°C to give a polymer. The polymer is extruded to make chips. The polymer shows a melting point of 239°C, a relative viscosity of 2.41 and a water content of 0.08 %.

The dried chips of the polymer obtained as above are extruded at 275°C through a T die on a chill roll of 75°C to make a film of 170 $\mu$ in thickness. The film is sent to rolls which are heated at 90°C and different from each other in the circumferential speed and drawn in the machine direction at a draw ratio of 3.5

| Haze after treatment with boiling water (%) | 46 |
|---|---|
| Oxygen permeability coefficient (CC-cm/cm$^2$.sec.cmHg) | 2.2 × 10$^{-13}$ |
| Plane orientation index | 0.042 |
| Degree of balance | 0.018 |

EXAMPLE 10

A mixture of the nylon salt of xylylenediamine consisting of 99 % of MXD and 1 % of PXD with adipic acid and the nylon salt of PEG-DA with adipic acid (PEG number average molecular weight, 8,300) in a weight ratio of 99 : 1 is subjected to polycondensation. The dried chips of the resulting polymer (M.P., 239°C; relative viscosity, 2.37) are melted at 270°C and extruded through a T die on a chill roll to make a film of about 210 μ in thickness. The film is drawn in the machine direction at a draw ratio of 3.86 with a roll heated at 87°C and then drawn in the transverse direction at a draw ratio of 4.35 in a tenter kept at 110°C, followed by heat setting at 200°C for 15 seconds to give a biaxially drawn film of 12 μ in thickness.

An anchor coating agent (concentration, 4 %) is applied on the surface of the above obtained biaxially drawn film according to the lami-roll method and, after drying with hot air of 110°C in a drying apparatus of 2 m long, polyethylene ("Petrosen 205" manufactured by Mitsui Polychemical Co., Ltd.) is melt extruded at 350°C thereon with a rate of 60 m/min to make a layer of 40 μ. The thus obtained laminated film is subjected to heat bonding at 180°C under 2 kg/cm$^2$ for 1 second and then the peel strength is measured. The results are shown in Table 8.

Table 8

| Anchor coating agent | Peel strength (g/20 mm) | Heat seal strength (kg/15 mm) | |
|---|---|---|---|
| | | Before treatment with boiling water | After treatment with boiling water* |
| Nipporan 3002/ Coronet L (manufactured by Nippon Polyurethane Co., Ltd.) | Not peeled | 3.6 | 3.4 |
| BSL 2306/BLS 2319 (manufactured by Toyo Ink K.K.) | Not peeled | 3.4 | 3.2 |
| EPS 623A/KN 40 (manufactured by Dainippon Ink & Chemicals Inc.) | Not peeled | 3.6 | 3.5 |
| XN 185 (manufactured by Dainippon Ink & Chemicals Inc.) | Not peeled | 3.3 | 3.2 |
| None | 180 | 3.0 | 1.8 |

Note: *)Measured after treatment with boiling water for 30 minutes.

From the above results, it is understood that the adhesive strength between the polyamide film and a polyethylene film without any anchor coating agent is considerably low and the heat seal strength in such case is much lowered by treatment with boiling water. Thus, the use of an anchor coating agent is recommended.

Still, the laminated film as prepared in this Example can afford a bag of sufficient strength, when manufactured by the use of an automatic bag making machine which is provided with a hot plate set at 220° to 230°C and operated at a speed capable of manufacturing 60 bags per minute.

What is claimed is:

1. A block copolymer of 99.8 to 90 % by weight of a polyamide segment and 0.2 to 10 % by weight of a polyether segment dispersed in an island state of not more than about 10 μ in particle size, the polyamide segment comprising at least one diamine component containing 100 to 50 mol % of m-xylylenediamine or its mixture with p-xylylenediamine and at least one dicarboxylic acid component containing 100 to 50 mol % of at least one aliphatic dicarboxylic acid having 6 to 12 carbon atoms, the polyether segment comprising at least one polyether having a molecular weight of 2,000 to 20,000 and an amino group or a carboxyl group at at least one terminal position thereof and the block copolymer having a scattering index of not less than 1.

2. The block copolymer according to claim 1, wherein the diamine component contains 100 to 70 mol % of m-xylylenediamine or its mixture with p-xylylenediamine.

3. The block copolymer according to claim 1, wherein the dicarboxylic acid component contains 100 to 70 mol % of at least one aliphatic dicarboxylic acid having 6 to 12 carbon atoms.

4. The block copolymer according to claim 1, wherein the diamine component contains 100 to 70 mol % of a mixture of m-xylylenediamine and p-xylylenediamine, the content of p-xylylenediamine being not more than about 30 % by weight based on the mixture, and wherein the dicarboxylic acid component contains 100 to 70 mol % of at least one aliphatic dicarboxylic acid having 6 to 12 carbon atoms.

5. The block copolymer according to claim 1, wherein the islands of the polyether segment are in a maximum size of not more than about 6 μ and in an average size of not more than about 3 μ.

6. The block copolymer according to claim 1, wherein the polyamide segment consists of m-xylyleneadipamide and the polyether segment consists of bis-aminopropyl(polyethylene oxide).

7. The block copolymer according to claim 1, wherein the polyamide segment consists of m-xylylene/p-xylylene/adipamide and the polyether segment consists of bis-aminopropyl(polyethylene oxide).

8. The block copolymer according to claim 1, wherein the polyamide segment consists of m-xylylenediamine/hexamethylenediamine/adipic acid and the polyether segment consists of bis-aminopropyl(polyethylene oxide).

9. A film made of the block copolymer according to claim 1.

10. The film according to claim 9, which has an initial Young's modulus at 20°C of not less than about 200 kg/mm$^2$, a folding enduarance of not less than about 5,000 and an oxygen permeability coefficient at 30°C of not more than about $2 \times 10^{-12}$ ml.cm/cm$^2$.sec.cmHg.

11. A biaxially drawn film according to claim 9, which has a breaking strength in the mechanical and transverse directions of not less than about 10 kg/mm$^2$, a breaking elongation in the mechanical and transverse directions of about 20 to 120 %, a folding endurance of not less than about 150,000 and a low temperature impact strength (at −40°C) of not less than about 6 kg.cm/25 μ.

12. The biaxially drawn film according to claim 10, wherein the polyamide segment consists of m-xylyleneadipamide and the polyether segment consists of bis-aminopropyl(polyether oxide).

13. The biaxially drawn film according to claim 10, wherein the polyamide segment consists of m-xylylene/p-xylylene/adipamide and the polyether segment consists of bis-aminopropyl-(polyethylene oxide).

14. A process for preparing the block copolymer according to claim 1 which comprises subjecting an aqueous slurry comprising at least one diamine component containing 100 to 50 mol % of m-xylylenediamine or its mixture with p-xylylenediamine and at least one dicarboxylic acid component containing 100 to 50 mol % of at least one aliphatic dicarboxylic acid having 6 to 12 carbon atoms to heat polymerization in the presence of at least one polyether having a molecular weight of 2,000 to 20,000 and an amino group or a carboxyl group at at least one terminal position thereof under a steam pressurized condition within a gauge pressure range of 5 to 15 kg/cm$^2$ up to the production of a polymer of a low degree of polymerization corresponding to a relative viscosity of about 1.2 to 1.5, releasing the steam so as to attain atmospheric pressure and then continuing the polymerization so as to produce a higher degree of polymerization.

15. The block copolymer according to claim 1, wherein the amount of polyether segment in said block copolymer is about 1 to 5% by weight and the corresponding amount of polyamide segment is about 99 to 95% by weight.

* * * * *